United States Patent
Ford et al.

(10) Patent No.: US 10,101,988 B2
(45) Date of Patent: Oct. 16, 2018

(54) DYNAMIC FIRMWARE UPDATING

(71) Applicant: HEWLETT PACKARD ENTERPRISE DEVELOPMENT LP, Houston, TX (US)

(72) Inventors: Thomas Ford, Plano, TX (US); Derek Schumacher, Auburn, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 295 days.

(21) Appl. No.: 14/759,199

(22) PCT Filed: Jan. 15, 2013

(86) PCT No.: PCT/US2013/021515
§ 371 (c)(1),
(2) Date: Jul. 3, 2015

(87) PCT Pub. No.: WO2014/112969
PCT Pub. Date: Jul. 24, 2014

(65) Prior Publication Data
US 2015/0355897 A1    Dec. 10, 2015

(51) Int. Cl.
G06F 9/445    (2018.01)
G06F 8/65     (2018.01)
G06F 8/654    (2018.01)
G06F 8/656    (2018.01)
G06F 8/71     (2018.01)

(52) U.S. Cl.
CPC ............ *G06F 8/65* (2013.01); *G06F 8/654* (2018.02); *G06F 8/656* (2018.02); *G06F 8/71* (2013.01); *G06F 9/44521* (2013.01)

(58) Field of Classification Search
None
See application file for complete search history.

(56) References Cited

U.S. PATENT DOCUMENTS 5,872,973 A * 2/1999 Mitchell ................. G06F 9/465
                                                717/108
6,148,349 A * 11/2000 Chow ............... G06F 15/17375
                                                709/214

(Continued)

FOREIGN PATENT DOCUMENTS

CN    1906575      1/2007
JP    H04-213148   8/1992

(Continued)

OTHER PUBLICATIONS

Chen, Haibo, et al. "Dynamic software updating using a relaxed consistency model." IEEE Transactions on Software Engineering 37.5(2011): 679-694. (Year: 2011).*

(Continued)

*Primary Examiner* — Matthew J Brophy
(74) *Attorney, Agent, or Firm* — Hewlett Packard Enterprise Patent Department

(57) ABSTRACT

A dynamic firmware update process includes finding an updated version of a dynamic data-object in firmware memory. A callback handle for an in-use version of the dynamic data object in use by a consumer is identified. The consumer of updated version of dynamic data object is notified using the callback handle.

15 Claims, 3 Drawing Sheets

(56) References Cited

U.S. PATENT DOCUMENTS

| | | | | |
|---|---|---|---|---|
| 6,353,926 | B1* | 3/2002 | Parthesarathy, Sr. | G06F 8/65 707/999.202 |
| 6,536,038 | B1* | 3/2003 | Ewertz | G06F 8/65 711/1 |
| 6,640,278 | B1* | 10/2003 | Nolan | G06F 3/0601 707/999.001 |
| 7,146,609 | B2 | 12/2006 | Thurston et al. | |
| 7,197,545 | B1* | 3/2007 | Davie | G06F 3/0605 709/220 |
| 7,260,818 | B1* | 8/2007 | Iterum | G06F 8/71 717/102 |
| 7,305,672 | B2 | 12/2007 | Vincent | |
| 7,996,850 | B2* | 8/2011 | Massmann | G06F 9/4493 719/320 |
| 8,117,293 | B1* | 2/2012 | Anderson | G06F 8/71 709/223 |
| 8,185,886 | B2 | 5/2012 | Rothman et al. | |
| 8,694,984 | B2* | 4/2014 | Chang | G06F 8/65 717/169 |
| 8,972,964 | B2* | 3/2015 | Beale | G06F 8/656 717/168 |
| 9,116,775 | B2* | 8/2015 | Thodati | G06F 8/654 |
| 2004/0002960 | A1* | 1/2004 | Drake | G06F 8/71 |
| 2004/0197073 | A1* | 10/2004 | Oesterreicher | H04N 21/241 386/332 |
| 2004/0205776 | A1* | 10/2004 | Harrington | G06F 8/656 719/320 |
| 2004/0230965 | A1* | 11/2004 | Okkonen | G06F 8/71 717/168 |
| 2005/0149922 | A1* | 7/2005 | Vincent | G06F 8/656 717/172 |
| 2008/0028385 | A1 | 1/2008 | Brown et al. | |
| 2008/0155524 | A1 | 6/2008 | Shone et al. | |
| 2008/0163253 | A1* | 7/2008 | Massmann | G06F 9/4493 719/316 |
| 2008/0184217 | A1* | 7/2008 | Kai | G06F 8/656 717/168 |
| 2009/0007089 | A1* | 1/2009 | Rothman | G06F 8/65 717/168 |
| 2009/0144455 | A1 | 6/2009 | Chen | |
| 2010/0011134 | A1* | 1/2010 | Brockmann | G06F 8/656 710/14 |
| 2010/0191951 | A1* | 7/2010 | Malone | G06F 8/65 713/2 |
| 2010/0199078 | A1 | 8/2010 | Shih et al. | |
| 2011/0145807 | A1 | 6/2011 | Molinie et al. | |
| 2012/0144456 | A1* | 6/2012 | Anderson | G06F 8/71 726/4 |
| 2012/0259863 | A1* | 10/2012 | Bodwin | G06F 17/30309 707/747 |
| 2014/0007073 | A1* | 1/2014 | Cavalaris | G06F 8/654 717/172 |
| 2014/0033187 | A1* | 1/2014 | Beale | G06F 8/656 717/168 |
| 2016/0232116 | A1* | 8/2016 | Bone | H04W 4/70 |

FOREIGN PATENT DOCUMENTS

| | | |
|---|---|---|
| JP | H07-104992 | 4/1995 |
| JP | 2000259519 | 9/2000 |
| JP | 2002366381 | 12/2002 |
| JP | 2004-318880 | 11/2004 |
| JP | 2005050097 | 2/2005 |
| JP | 2008090846 | 4/2008 |
| JP | 2008165627 | 7/2008 |
| JP | 2009065980 | 11/2009 |
| JP | 2012-043118 | 3/2012 |
| JP | 2012-248018 | 12/2012 |
| TW | 201027432 A | 7/2010 |
| TW | 201030605 A | 8/2010 |

OTHER PUBLICATIONS

Giuffrida, Cristiano, et al. "Back to the Future: Fault-tolerant Live Update with Time-travelingState Transfer." LISA. 2013. (Year: 2013).*

PCT/ISA/KR, International Search Report, dated Sep. 27, 2013, 12 pps, PCT/US2013/021515.

Habib Seifzadeh; A Method for Dynamic Software Updating in Real-time Systems; http://ieeexplore.ieee.org/stamp/stamp.jsp?arnumber=5223140 > 34-38 pp; Jun. 1-3, 2009.

Extended EP Search Report—EP appl. 13871582.6—published date Sep. 21, 2016—6 pages.

* cited by examiner

DYNAMIC FIRMWARE UPDATING

CROSS-REFERENCE TO RELATED APPLICATION

This application is a national stage application under 35 U.S.C. § 371 of PCT/US2013/021515, filed Jan. 15, 2013.

BACKGROUND

Modern computers and computer-based systems typically include platform firmware, i.e., code (representing instructions and non-instruction-type data) stored in non-volatile "firmware" memory and used for initializing and for low-level functionality of a computer-based system. Typically, firmware code is loaded into relatively fast volatile memory for use.

It is sometimes desirable to update firmware, e.g., to fix firmware bugs, to add features, or to tweak system parameters. In older computer systems, updating firmware can involve swapping out one firmware read-only-memory (ROM) encoded with the firmware to be replaced for another encoded with the updated firmware. More recently, firmware is stored in rewritable non-volatile memory so that firmware updates can be updated in place. Such updates can take effect once the system is reinitialized, i.e., rebooted.

BRIEF DESCRIPTION OF THE DRAWINGS

The following figures represent examples and not the invention itself.

DETAILED DESCRIPTION

In a mission-critical context, e.g., network-supported medical alert and other emergency services, financial transactions, and online retailing, in which computers are expected to be "highly available", rebooting a system to complete installation of firmware can be costly. Examples herein allow some firmware updates to be implemented without rebooting. This not only saves costs associated with rebooting, but also encourages wider use of firmware updates, e.g., enhancing performance by dynamically tweaking firmware parameters. Herein, firmware updates are "dynamic" if they can be implemented (i.e., put to use, as opposed to merely being written) without rebooting.

Figure 1:
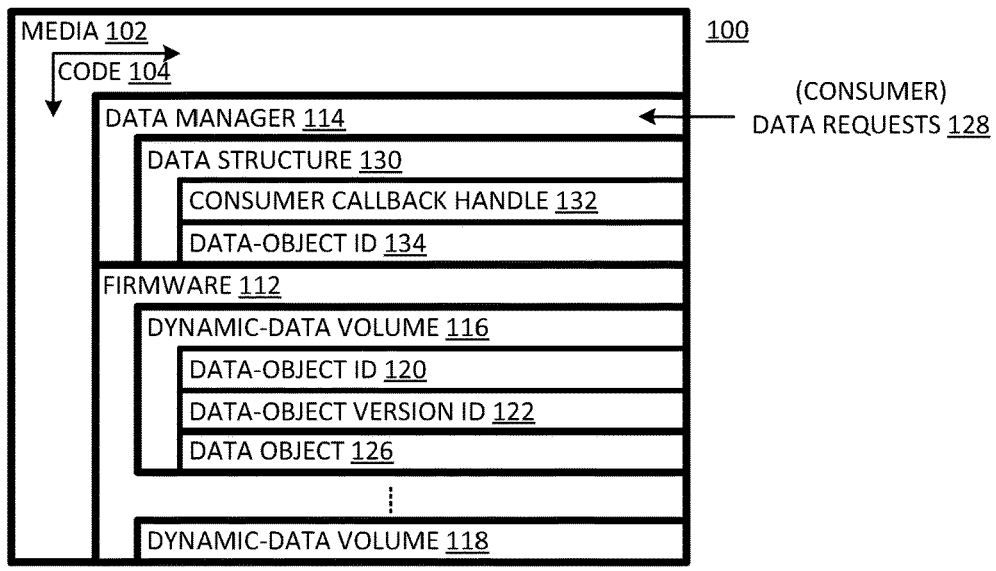
FIG. 1 is a schematic diagram of a system in accordance with an example.

An example system 100, shown in FIG. 1, includes storage media 102 encoded with code 104. Code 104 includes firmware 112 and a data manager 114 (which, depending on the variation, may or may not be in firmware). Data of firmware 112 is arranged in dynamic-data volumes, e.g., volumes 116 and 118. Each data volume includes data-object meta-data to specify: a data-object identifier (ID) 120, a data-object version ID 122, and a data object 126.

Data manager 114 manages requests 128 from consumers (e.g., software entities) for firmware data objects. Data manager keeps track of which consumers are using which data objects in a data structure 130 that stores data object IDs 134 in association with consumer callback handles 134.

Figure 2:
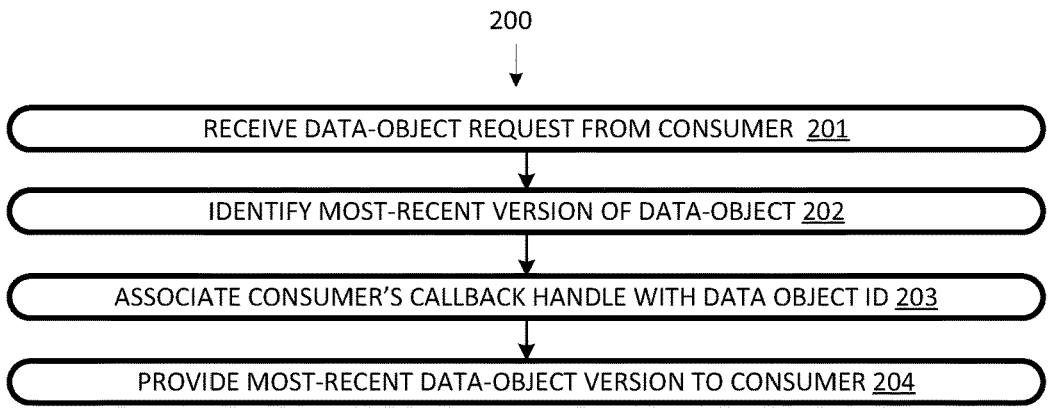
FIG. 2 is a flow chart of a data-object request handling process implementable on the system of FIG. 1 and in accordance with an example.

Data manager 114 is to implement a data-object request handling process 200, flow charted in FIG. 2. At 201, a request for a data object is received from a consumer. At 202, a most-recent version of the requested data object is identified. At 203, a callback handle for the consumer is stored in association with an identity of the requested data object. At 204, the most-recent version of the requested data object is provided to the consumer so that it becomes an "in-use" version of the data object. Process 200 can be implemented by other entities, and data manager 114 can implement other processes, as demonstrated further below.

Figure 3:
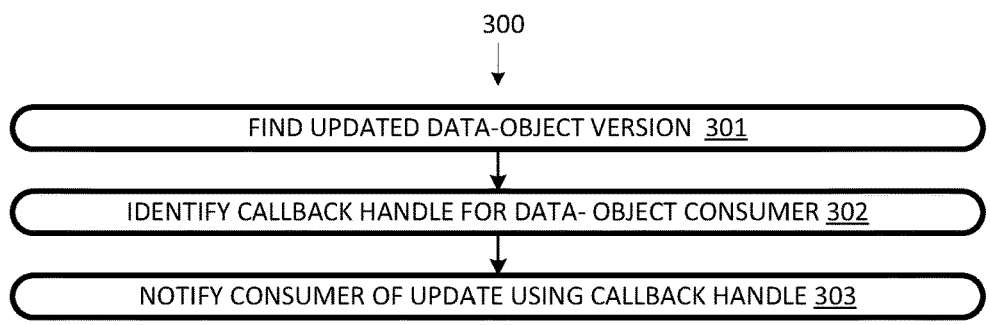
FIG. 3 is a flow chart of a firmware-update process implementable on the system of FIG. 1 and in accordance with an example.

Data manager 114 can implement a data-object update process 300, flow charted in FIG. 3. At 301, an updated version of a data-object version is found. At 302, a callback handle of a consumer of the data object is identified. At 303, using the callback handle, the consumer of the data object is notified of the update.

Once it is notified of an update, a consumer may request the updated object immediately or at a later time. For example, if requesting and using the updated data object would cause a conflict or other problem in an ongoing procedure, the consumer can wait for a more opportune time to update its copy of the data object. In any event, the dynamic data firmware update can be managed in a way that avoids any coherency problem and without requiring a reboot (which might interfere with service level objectives for a highly available computer system).

As shown in the next example, the data volumes can store data-object metadata other than that shown for system 100. For instance, a data volume can include a security key that can be used to ensure that an update is from an authorized source and is not the result of error or malice.

A computer system 400 includes a processor 402, communications devices 404, and non-transitory storage media 406. Media 406 is encoded with code 408. Code 408 includes firmware 410, consumers 412, a firmware update utility 414, and an update flag 416. In another example, flag 416 is implemented in hardware. Firmware 410 includes a data manager 420, an update handler 422, and data volumes 430, including data volumes 432, 434, and 436.

Each data volume 430 is a combination of a data-volume data structure and its contents. The contents include a data-object ID, a data-object attribute, a data-object version ID, a security key, other metadata, and a data-object. The data-object ID can be a globally-unique identifier (GUID). The data-object attribute specifies whether a given data object is a dynamic data object or a static data object. A dynamic data object for which a change can be implemented without rebooting, while rebooting is required to implement a changed static data object. "Other metadata" can include locations or object size information that can be used to determine where the boundaries of a data volume or a data object value are located. In addition, "other metadata" can include other information characterizing a data object useful to data manager 420 or a consumer 412.

Data volume 432 includes a data-object ID 440, an attribute 442, a version ID 444, a valid flag 445, a security key 446, other metadata 447, and a data-object 448. Attribute 442 is set to "static" so changes (which would be represented by another data volume) to the data-object having data-object ID 440 would only take place after a reboot of system 400. Version ID 444 is the most-recent version, in this case the latest version of the data-object represented among data volumes 430. Data object 448 is the data object that is provided to a consumer 412 in response to a request.

Data volume 434 includes a data-object ID 450, an attribute 452, a version ID 454, a valid flag 455, a security key 456, other metadata 457, and a data-object 458. In this case, attribute 452 is set to "dynamic", indicating that a change of the data object (value) can be implemented without a reboot. The version ID, which can be a numerical value such as "4.2", happens to correspond to the in-use version for the data object with ID 450 in that it is currently in use by consumer 412.

Figure 4:
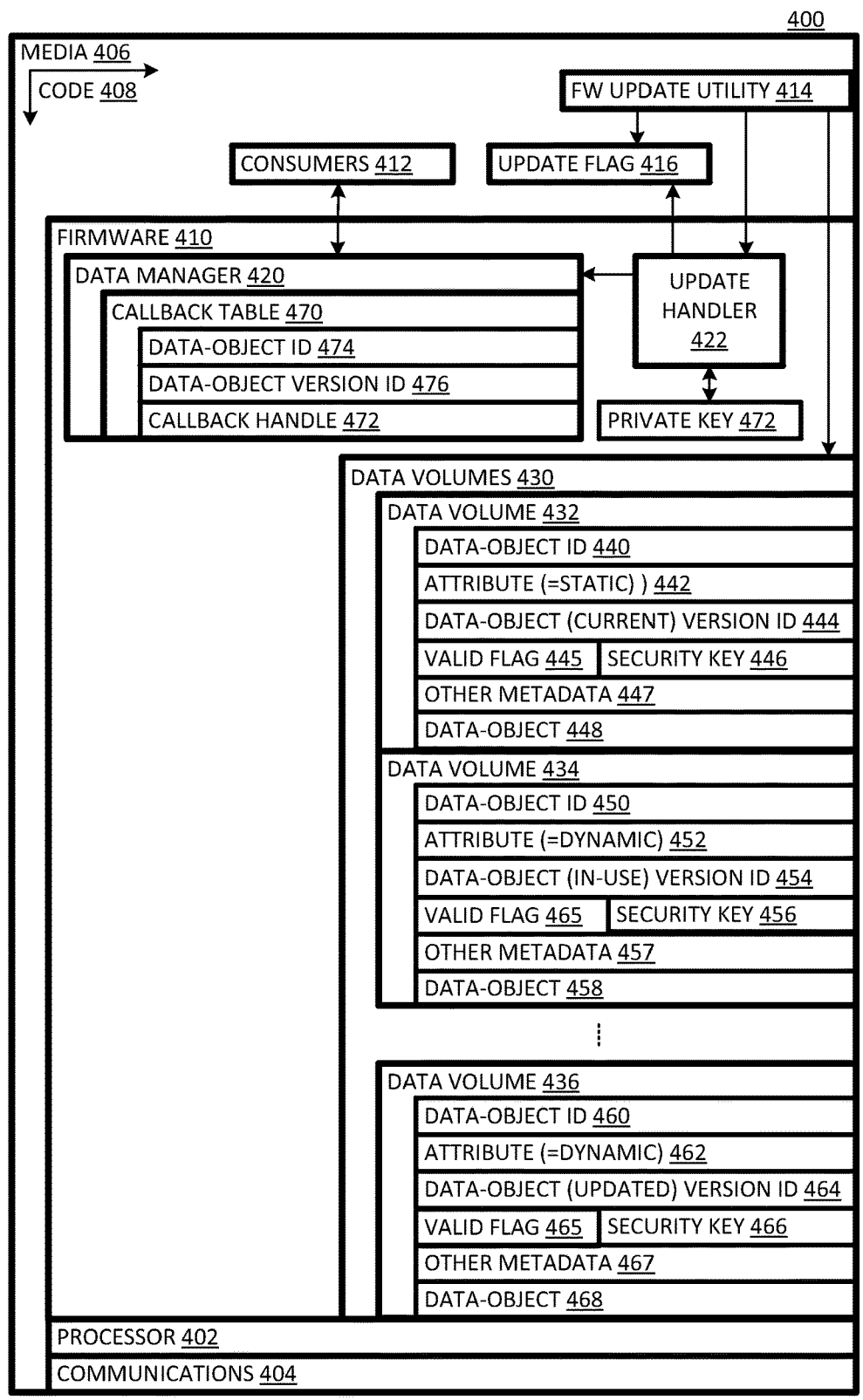
FIG. 4 is a schematic diagram of another system in accordance with an example.

However, while in-use data object 458 was the most-recent version at the time it was requested by consumer 412, it is not the most recent version at the time represented in FIG. 4. This is because a newer version has been written to firmware 410 since consumer 412 requested data object 458. This newer updated version is represented in data volume 436.

Data volume 436 includes a data object ID 460, an attribute 462, a version ID 464, a valid flag 465, a security key 466, other metadata 467, and a data-object 468. Data object 468 is an updated version of data object 458. Accordingly, data-object ID 460 equals data-object ID 450, and version ID 464 (e.g., version 4.3) corresponds to a later version than version ID 454 (e.g., version 4.2). Attributes of different versions of an object are generally the same so attributes 452 and 462 are the same, both set at "dynamic". In some cases, however, an update changes the attribute for a data object.

Data manager 420 keeps track of which consumers are using which data objects. To this end, data manager 420 includes a data structure, e.g., callback table 470, that associates consumer callback handles 472 with data-object identities 474 for each data object currently in use by a consumer and with the data-object version ID for the data object in use. For example, in the time represented in FIG. 4, an object identity for data object 458 would be associated with a consumer callback handle in callback table 470.

Figure 5:
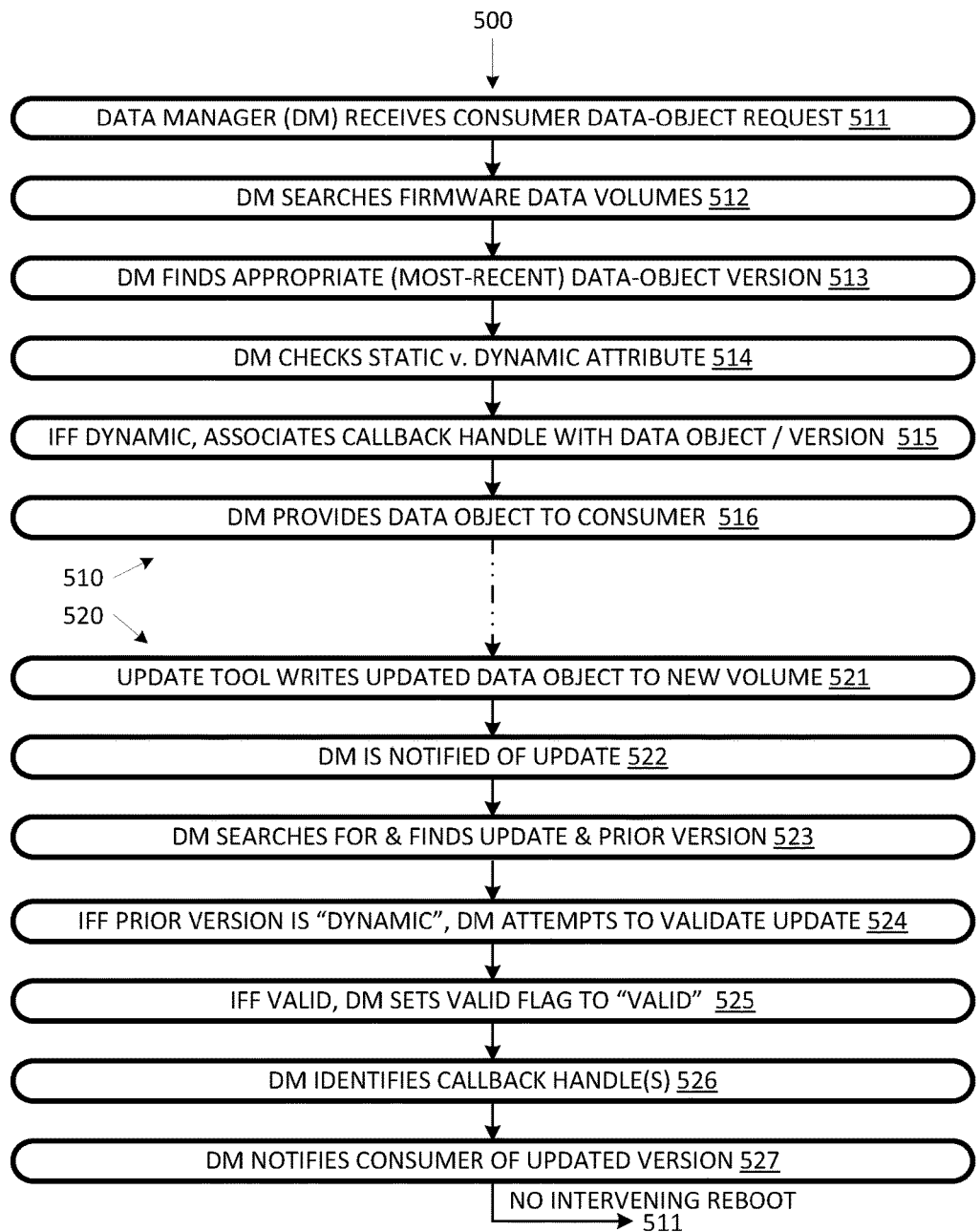
FIG. 5 is a flow chart of a firmware-update process implementable on the system of FIG. 4 and in accordance with an example.

System 400 provides for implementation of firmware-update process 500, flow charted in FIG. 5. Process 500 includes a request section 510 and an update section 520. Request section 510 includes action 511, in which a data manager receives from a consumer a request for a data object. The request can specify a GUID or other identifier for the object.

At 512, the data manager searches the data volumes for an appropriate version of the requested data object to fulfill the request. At 513, the data manager finds the appropriate version of the data object. In the illustrated process 500, the appropriate version is the most-recent valid version. Invalid versions, as indicated by their respective valid flags, are not searched. Recency can be determined by comparing version numbers of found valid versions of the requested data object.

Immediately after a data-object update, the updated version can be different from any version in use by a consumer. If another consumer requests a data object for which the most-recent version differs from the in-use version, it may be desirable for consistency to fulfill the request with the in-use version instead of the most-recent version. In such an example and scenario, the in-use version is the "appropriate" version with which to fulfill the request. In the illustrated variation of process 500, an updated version of a data object is not marked "valid" until the data manager has been informed of the updated version. Thus, the data manager can retire the in-use version of a requested data object before fulfilling any additional requests for it with the updated (i.e., most-recent) version.

At 514, the data manager checks the "static" versus "dynamic" attribute for the appropriate version of the data object. At 515, if and only if (iff) the attribute is "dynamic", the data manager associates the callback handle with the data-object identity and the data-object version identity, e.g., in callback table 470. If the attribute is "static", no entry is made in the callback table. At 516, the data manager fulfills the request by providing the appropriate version of the data object to the consumer that requested the data object.

Update section 520 of process 500 includes, at 521, an update tool writing an updated data object to a new volume at an unused area of firmware. When a data object is updated, the updated version is written to an empty area of firmware and the previous version is not deleted. However, the update utility may provide "clean-up" of older versions once it is certain that they will not be reverted to or otherwise used. In the illustrated variant of process 500, the valid flag for the updated version is initially set to "invalid".

At 522, the data manager is notified of the update. In one variant, a data manager discovers updates by polling (e.g., periodically) the data volumes. In another variant, the update tool sets an update flag (e.g., flag 416) and triggers an update handler (e.g., update handler 422). The handler can be triggered using a platform-management interrupt or a system management interrupt (SMI). The update handler then notifies the data manager of the update.

At 523, the data manager searches for and finds the data volumes respectively for the update and its immediate predecessor, which the data manager can identify by their version IDs. At 524, if and only if (iff) the attribute for the predecessor version is "dynamic", the data manager attempts to validate the updated version of the data object, e.g., by checking the security key for the updated version using the data manager's private key 472. Note, that if all versions of a data object are required to have the same attribute value, then, at 524, the attribute for the updated version can be used instead of the attribute for its predecessor. If, at 524, prior version is "static", no further action is taken with respect to the update until the next boot, at which time validation is performed.

If the updated version is determined to be valid at 525, the data manager sets its valid flag to "valid" at 526. In another variant of process 500, the update handler performs the validity check and, if and only if the update is valid, informs the data manager of the update and sets the valid flag to "valid". If an updated version of a data object is determined to be invalid, e.g., the updated version either continues to be marked "invalid" or is deleted.

At 526, the data manager checks its callback table for entries matching the updated dynamic data object. If there are any matches, each associated callback handle is used to inform the respective consumer of the update. At 527, if and only if (iff) the dynamic data object is in use, the data manager notifies the consumer or consumers (that are using the earlier version of the data object) of the update. The data manager can hold requests by other consumers for the same data object until consumers of the earlier data object are no longer using it. Process 500 can then return to 511 without an intervening reboot. The consumer may request the dynamic data object either immediately after the notice or at some later time as appropriate given the use of the prior version of the data object.

An alternative example does not use valid flags in the data-object volumes to indicate validity. Instead, a data manager tracks updates of static data objects internally so that the updates are not used to fulfill a consumer request prior to a reboot. Upon reboot, the data used to track updates is lost, so that, after the reboot, the data manager will fulfill requests using the updated static data objects.

Herein, a "system" is a set of interacting non-transitory tangible elements, wherein the elements can be, by way of example and not of limitation, mechanical components, electrical elements, atoms, physical encodings of instructions, and process actions. Herein, "process" refers to a sequence of actions resulting in or involving a physical transformation.

Herein, unless otherwise clear from context, "data" is used in the inclusive sense that encompasses executable instructions as well as non-instruction-type data. Herein, "data object" encompasses single bits, strings, and arrangements of bits and/or strings. Herein, "storage medium" and "storage media" refer to a system including non-transitory tangible material in or on which information is or can be encoded with data (including instructions and non-instruction-type data) and data objects. Herein, unless otherwise clear from context, "firmware" refers to code stored in persistent (i.e., non-volatile memory) solid-state memory and code resulting from booting code from persistent solid-state memory. "Firmware memory" refers to non-volatile memory used for storing firmware code.

Herein, a "version" is a particular form of a thing, e.g., a data object, that differs in some way from other versions of the same thing. Herein, a data object is said to be "dynamic" if it can be updated and used without a reboot. Herein, a data object is said to be "static" if an update of it cannot be used without a reboot. Herein, a "consumer" is an executing process that requests and uses a data object. Herein, a "callback handle" is a data item used to send information to a process that previously sent a request, e.g., for a data object.

Herein, a "computer" refers to a hardware machine for manipulating physically encoded data in accordance with physically encoded instructions. Herein, unless other apparent from context, a functionally defined component of a computer is a combination of hardware and software executing on that hardware to provide the defined functionality.

Herein, "processor" refers to hardware for executing instructions. A processor can be a monolithic device, e.g., integrated circuit, a portion of a device, e.g., core of a multi-core integrated circuit, or a distributed or collocated set of devices. Herein, "communications devices" refers to devices used for communication, including both network devices and devices used for input and output, e.g., human interface devices.

In this specification, related art is discussed for expository purposes. Related art labeled "prior art", if any, is admitted prior art. Related art not labeled "prior art" is not admitted prior art. In the claims, "said", if used, introduces elements for which there is explicit verbatim antecedent basis; "the" introduces elements for which the antecedent basis may be implicit. The illustrated and other described embodiments, as well as modifications thereto and variations thereupon are within the scope of the following claims.

What is claimed is:

1. A non-transitory storage media encoded with code defining a data manager and firmware, the firmware including data volumes including respective data-object versions along with associated data-object identifiers (IDs) and data-object version IDs, the data manager being executable by a system to:

in response to a request from a consumer for a dynamic data object, identify a most-recent version of the dynamic data object using a data-object ID for the dynamic data object and data-object version IDs for different versions of the dynamic data object;

store a callback handle for the consumer in association with the most-recent version of the dynamic data object; and provide the most-recent version of the dynamic data object to the consumer so that the dynamic data object becomes an in-use dynamic data object, wherein another of the data-object versions is a static data object for which an update can only be put in use after a reboot following a writing of the updated static data object to a data volume of the firmware, the data volumes including an attribute for each respective data-object version of the data-object versions indicating whether the respective data-object version is static or dynamic.

2. A system comprising:

a processor; and a non-transitory storage medium storing instructions executable on the processor to:

find an updated version of a data object;

determine whether the data object is a static data object or a dynamic data object;

in response to determining that the data object is a static data object, decline to fulfill a consumer request for the static data object until a reboot of the system has occurred;

in response to determining that the data object is a dynamic data object:

identify a callback handle for an in-use version of the dynamic data object; and using the callback handle, notify a consumer of the dynamic data object of the existence of the updated version of the dynamic data object.

3. A non-transitory storage media storing instructions that upon execution cause a system to:

receive a request for a data object from a consumer;

determine whether the data object is a static data object or a dynamic data object;

in response to determining that the data object is a static data object, decline to fulfill the request until a reboot of the system has occurred;

in response to determining that the data object is a dynamic data object:

identify in firmware memory a most-recent of plural versions of the dynamic data object;

store a callback handle for the consumer in association with an identity of the dynamic data object; and provide the most-recent version to the consumer.

4. The non-transitory storage media of claim 3, wherein the instructions upon execution cause the system to:

write an updated version of the data object to the firmware memory; and in response to the writing, notify the consumer of the updated version of the data object.

5. The system of claim 2, wherein the identifying of the callback handle comprises accessing a data structure that associates callback handles of respective consumers with data-object IDs of dynamic data objects in use by the respective consumers, wherein the identified callback handle is a selected one of the callback handles in the data structure.

6. The system of claim 2, wherein the consumer that is notified is a software entity.

7. The system of claim 2, wherein the updated version of the data object is for a firmware.

8. The system of claim 2, wherein the determining of whether the data object is a static data object or a dynamic data object comprises accessing attributes associated with data objects in a firmware, each attribute of the attributes indicating whether a respective data object of the data objects is static or dynamic.

9. The non-transitory storage media of claim 3, wherein the determining of whether the data object is a static data object or a dynamic data object comprises accessing attributes associated with data objects in a firmware, each attribute of the attributes indicating whether a respective data object of the data objects is static or dynamic.

10. A method comprising:
    receiving, by at least one processor of a computing system, a first request for a first data object from a first consumer;
    receiving, by the at least one processor, a second request for a second data object from a second consumer;
    determining whether each of the first data object and the second data object is a static data object or a dynamic data object;
    in response to determining that the first data object is a static data object, decline to fulfill the request until a reboot of the system has occurred;
    in response to determining that the second data object is a dynamic data object:
        identifying in firmware memory a most-recent of plural versions of the dynamic data object;
        storing a callback handle for the second consumer in association with an identify of the dynamic data object; and
        providing the most-recent version to the second consumer.

11. The method of claim 10 further comprising:
    writing an updated version of the second data object to the firmware memory; and
    in response to the writing, notifying the second consumer of the updated version of the second data object.

12. The method of claim 11, wherein the updated version of the data object is for a firmware.

13. The method of claim 10, wherein the determining of whether the first data object and the second data object is a static data object or a dynamic data object comprises accessing a plurality of attributes corresponding to a plurality of data objects in a firmware, each attribute of the attributes indicating whether a respective data object of the data objects is static or dynamic.

14. The method of claim 10, wherein the second consumer that is notified is a software entity.

15. The method of claim 10, wherein the first consumer and the second consumer are a same consumer.

* * * * *